Oct. 23, 1956     P. J. KIRCHER     2,767,882
PERCOLATOR CAPACITY MARKING
Filed July 21, 1952
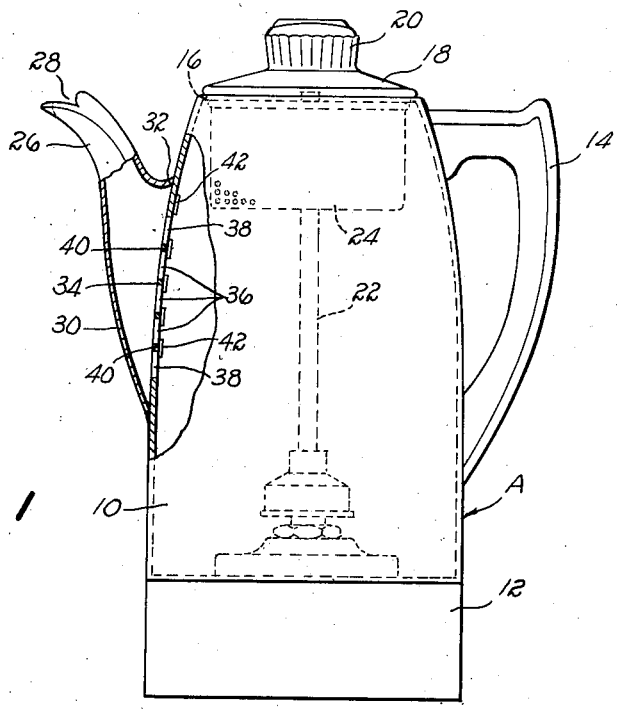
FIG. 1
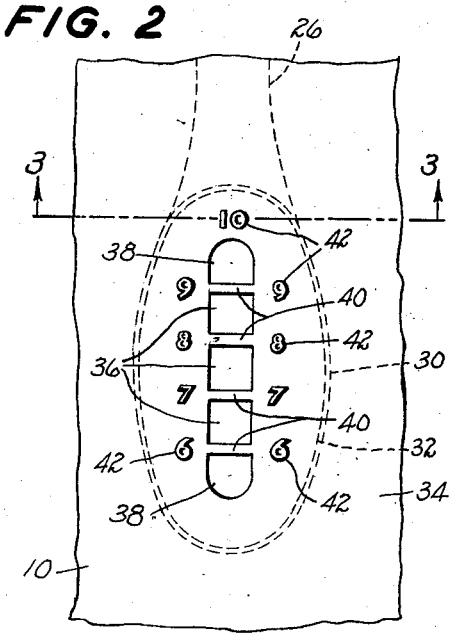
FIG. 2
FIG. 3
FIG. 4
INVENTOR.
PAUL J. KIRCHER
BY
*Lindsey and Prutzman*
ATTORNEYS

United States Patent Office 2,767,882
Patented Oct. 23, 1956

2,767,882

PERCOLATOR CAPACITY MARKING

Paul J. Kircher, Plainville, Conn., assignor to Landers, Frary & Clark, New Britain, Conn., a corporation of Connecticut Application July 21, 1952, Serial No. 299,975

2 Claims. (Cl. 222—26)

The present invention relates to coffee percolators and similar vessels having a pouring spout and in which measured quantities of liquids are to be contained. The invention is particularly directed to an arrangement for marking the levels of measured quantities of liquids contained in the vessel.

There is a great demand for coffee makers which are marked in some fashion so that the coffee maker itself can be used as a measuring device and many efforts have been made to satisfy this demand. However, prior to the present invention, no completely satisfactory arrangement has been devised to permit the coffee maker itself to serve effectively as a measuring device. One obvious expedient, of course, has been to paint or otherwise inscribe lines or other indicia in a contrasting color on the interior of the vessel, but this expedient is of little utility since the markings are extremely difficult to see even when new and they quickly deteriorate or wear off in use, so that they soon become useless. Another obvious expedient has been emboss the markings in the body of the percolator but this, too, has its serious drawbacks. While such embossed markings have a high degree of permanence and are satisfactory from that standpoint, they are only slightly improved from a visibility standpoint and, what is a very great disadvantage, they result in markings which shows on the exterior of the vessel and greatly detract from the appearance and sales appeal of the vessel. When using embossed indicia, the manufacturer is placed in a dielmma in that the smaller he makes the embossings, the more difficult it becomes for the operator to use them; and the larger he makes them, the more unsightly and unappealing becomes the coffee percolator. The matter of pleasing appearance is so primarily important that in the best grades and more expensive coffee percolators the embossings are reduced to a very small, almost inoperative size, or frequently are omitted entirely.

The object of the present invention is to provide a new arrangement for marking the liquid content of coffee percolators and the like which will be easy to see and use, which will remain in such condition for the life of the vessel, and which will not detract from the pleasing appearance of the vessel. Included in this object is the further object of devising such an arrangement which can be included in a coffee percolator at low cost and without the necessity for difficult and expensive manufacturing operations, and which will not be subject to other objections from a manufacturing, sales, or use standpoint.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the accompanying drawings:

Fig. 1 is an elevational view of a percolator incorporating thereinto a liquid content marking system in accordance with the teachings of the invention;

Fig. 2 is a fragmentary view looking outward from the interior of the percolator and showing the marking system in elevation;

Fig. 3 is an enlarged sectional view taken in the direction of line 3—3 of Fig. 2; and Fig. 4 is an elevational view of the numeral cross-sectionally shown in Fig. 3.

Referring to the drawings, there is shown in Fig. 1 a coffee percolator A in which has been included one embodiment of the new marking arrangement of the present invention. The coffee percolator A, selected for purposes of illustration, is an automatic electric coffee percolator of a type widely sold commercially. Such a coffee percolator is a high-grade type and relatively clostly and it has been selected for purposes of illustration to demonstrate that the arrangement of the present invention may be incorporated in such a coffee percolator, for example, without detracting from the appearance thereof. The coffee percolator as illustrated comprises a main body or vessel 10 provided with a false bottom 12 in which are housed the electrical controls and heating elements (not shown). Fixed to one side of the container 10 is a conventional handle 14 and at the top there is an opening 16 in which is received a lid 18 having at its center the usual glass dome 20 against the interior of which the percolating liquid impinges. The interior of the vessel is adapted to contain the usual fountain tube 22 and basket 24, in the latter of which is supported the ground coffee through which the water is percolated.

In this specific illustration a coffee percolator having a capacity of ten cups has been illustrated. Normally, such a percolator would be employed for making quantities of coffee varying from, for example, six to ten cups. At the maximum capacity of the percolator the water level would fall just below the basket 24, while at the six-cup level the top of the water would come about midway between the false bottom 12 and the basket 24. When the coffee percolator is to be used, the desired quantity of water is placed in the container 10 and the proportionate amount of ground coffee is placed in the basket 24, following which the contents are heated and brewing of the coffee takes place through the pumping of the water upwardly through the fountain tube 22 from which it falls through the basket 24 and returns to the main body of liquid in the container 10.

In accordance with the invention the spout 26, which is fixed such as by brazing, to the exterior of the vessel 10, is formed with a pouring opening 28 and an enlarged body 30 which, in the specific embodiment, is formed with an elongated, generally oval side edge 32 for engagement with the side of the vessel 10. The opening denoted by the side edge 32 is of such length that it encompasses the level of the water at the maximum capacity of the vessel 10 and down to and including the lowest level of water at which the percolator is intended to be used. In this particular instance, the opening 32 encompasses an area extending from the bottom of the basket 24 to a point below midway of the top and bottom of the percolator.

Further, in accordance with the invention, I perforate the wall 34 of the vessel 10, which is encompassed by the edge or rim 32 in such manner that the perforation serves as a liquid level indicator. The manner in which the perforation is made in order to accomplish this purpose, of course, is susceptible to many variations. In the drawings the perforation takes the form of three aligned rectangular openings 36 and top and bottom dome-shaped openings 38. As a result, there is left between the openings 36 and between the openings 36 and 38 small horizontal strips 40. In the present instance, the strips 40 are located at the liquid levels for six, seven, eight and nine cups of liquid in the vessel 10. The particular perforation illustrated is given merely by way of example and it will be appreciated that other configurations could be utilized for the same purpose. The essential requirement is that there be at least one opening and that the form of the opening or openings is such that it will indicate desired graduations of the height of the liquid in the vessel.

If desired, the perforated wall 34 may be combined with indicia such as the numerals indicated at 42. In the present illustration the indicia 42 consist of a double set of numerals six through nine and the numeral ten, which are heavily embossed in the wall 34. These indicia also come within the confines of the oval edge 32 and thus cannot be seen from the exterior of the percolator. The manner in which the numerals have been embossed in the specific embodiment is shown in more detail in the enlarged views of Figs. 3 and 4. Since the perforation of the wall 34 is the primary means for indicating the level of the liquid contained in the percolator, the indicia 42 may be printed or otherwise inscribed instead of being embossed, or may be eliminated entirely. It has been found that when the user becomes familiar with the particular percolator, he quickly becomes aware of the meaning of the perforations and no longer need rely upon the indicia.

The advantage of indicating the level of the liquid in the coffee percolator by means of perforations in the wall 34 resides in the fact that, although the interior of the percolator is poorly lighted, there is light transmitted through the perforation, which light enters by way of the spout 26. Accordingly, there is a very clear contrast in color between the portion of the perforated wall covered by the liquid and that above the level of the liquid. As a result, the operator can very quickly and easily determine the amount of liquid in the container by looking into the top of the same.

The provision of a perforated wall 34, which is perforated in such manner that it provides an indicator of the level of the liquid in the percolator, is inexpensive and adds very little to the cost of the percolator inasmuch as the wall has to be perforated in any event to permit the pouring of liquid through the spout 26, and therefore an additional operation is not required. All that is required is the provision of a specific die or punch to give the proper perforation. Similarly, embossing or otherwise including indica, if desired, is also an inexpensive operation.

The particular advantage of the arrangement is that, not only is there provided a level indicator composed of a perforated wall which provides a light contrast rendering the same easily visible by the operator, but also the light indicator including indicia, if used, is concealed by the spout 26 and therefore in no way detracts or even affects the external appearance of the percolator. Accordingly, there is provided a highly effective and inexpensive level indicator for measuring the contents of a coffee percolator or the like which will operate satisfactorily over the life of the vessel and which will in no way detract from the pleasing appearance and sales appeal of the percolator.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a coffee maker adapted to be filled with different amounts of water to produce different quantities of brewed coffee, a vessel for receiving the water having an upright wall, and a water measuring gauge integrally formed in said upright wall for measuring the contents of the vessel comprising a passageway in the portion of the upright wall extending vertically throughout the levels of amounts of water which may be selectively brewed in the coffee maker, said passageway being contoured to provide vertically spaced markings corresponding to the levels of predetermined quantities of water in the vessel, and a spout fixed to the outer surface of the wall with the base of said spout extending about the passageway, said passageway functioning as a pouring opening between the vessel and spout.

2. A coffe maker as defined in claim 1 having indicia on the interior of said upright wall adjacent said passageway to identify said vertically spaced markings in terms of said predetermined quantities of water, said indicia being located within the periphery of the base of said spout.

References Cited in the file of this patent
UNITED STATES PATENTS

| 298,222 | Milligan et al. | May 6, 1884 |
| 298,308 | Milligan et al. | May 6, 1884 |
| 888,930 | Robesky | May 26, 1908 |
| 2,533,578 | Gomersall | Dec. 12, 1950 |